United States Patent
Findlay et al.

(10) Patent No.: US 8,121,547 B2
(45) Date of Patent: Feb. 21, 2012

(54) IN-HEADSET CONFERENCE CALLING

(75) Inventors: Benedict Andrew Findlay, Swindon (GB); Scott Walsh, Foxham (GB)

(73) Assignee: Plantronics, Inc., Santa Cruz, CA (US)

( * ) Notice: Subject to any disclaimer, the term of this patent is extended or adjusted under 35 U.S.C. 154(b) by 529 days.

(21) Appl. No.: 12/343,932

(22) Filed: Dec. 24, 2008

(65) Prior Publication Data

US 2010/0159830 A1 Jun. 24, 2010

(51) Int. Cl.
H04B 7/00 (2006.01)

(52) U.S. Cl. .................................. 455/41.2; 455/412.2

(58) Field of Classification Search .............. 455/41.2, 455/412.2, 569.1, 450, 451, 452, 445, 452.1, 455/68; 709/204; 370/353, 260, 277, 225
See application file for complete search history.

(56) References Cited

U.S. PATENT DOCUMENTS

| | | | |
|---|---|---|---|
| 6,006,115 A | 12/1999 | Wingate | |
| 6,301,490 B1 | 10/2001 | Callan | |
| 6,519,475 B1 | 2/2003 | Kim | |
| 6,662,022 B1 | 12/2003 | Kanamori et al. | |
| 6,690,947 B1 | 2/2004 | Tom | |
| 6,985,592 B1 | 1/2006 | Ban et al. | |
| 7,187,948 B2 | 3/2007 | Alden | |
| 7,395,090 B2 | 7/2008 | Alden | |
| 2002/0016188 A1 | 2/2002 | Kashiwamura | |
| 2003/0073460 A1 | 4/2003 | van Pelt et al. | |
| 2003/0079035 A1 | 4/2003 | Boyd et al. | |
| 2006/0240817 A1 | 10/2006 | Akiyama et al. | |
| 2007/0260682 A1* | 11/2007 | Guccione | 709/204 |
| 2008/0220825 A1 | 9/2008 | Wu | |
| 2008/0299948 A1* | 12/2008 | Rosener | 455/412.2 |
| 2009/0082062 A1 | 3/2009 | Boyael et al. | |

FOREIGN PATENT DOCUMENTS

| | | |
|---|---|---|
| EP | 1267523 A1 | 12/2002 |
| EP | 1303115 A2 | 4/2003 |
| WO | 0119054 A1 | 3/2001 |

OTHER PUBLICATIONS

European Patent Office. International Search Report: PCT/US2009/061177. Mail Date: Jan. 26, 2010. Rijswijk, Netherlands.
European Patent Office. Written Opinion: PCT/US2009/061177. Mail Date: Jan. 26, 2010. Rijswijk, Netherlands.

* cited by examiner

*Primary Examiner* — Joseph Lauture
(74) *Attorney, Agent, or Firm* — Chuang Intellectual Property Law

(57) ABSTRACT

Systems and methods for establishing conference calls using a headset are presented. The headset includes a wireless communications transceiver operable to form a first local wireless link with a first local telephone in communication with a first far end telephone user and a second local wireless link with a second local telephone in communication with a second far end telephone user. The headset further includes a processor operable to establish a conference call between the headset user, the first far end telephone user, and the second far end telephone user.

20 Claims, 9 Drawing Sheets

IN-HEADSET CONFERENCE CALLING

BACKGROUND OF THE INVENTION

In the modern era, most individuals have several telephony devices (also referred to herein as "telephones", or simply "phones") available to them to make and receive calls. Mobile telephone handsets, such as cellular telephones, have become ubiquitous as users enjoy the convenience and portability they provide. In the home or office environment, users still typically maintain their traditional home desktop landline or office landline telephone using the traditional public switched telephone network (PSTN). More recently, users have started to utilize Voice over Internet Protocol (VoIP) telephones. The VoIP telephone may be a personal computer (PC) executing a VoIP application such as Skype™ that provides telephone communications service over the Internet. These VoIP telephones are popular with users as they provide telephony services for free or at reduced costs, including calls to international destinations.

Due to this increased availability of telephony devices, individuals will often have two or more telephones in their immediate vicinity. Thus, most users operate in a multiple telephony channel enabled environment, with more than one way of talking to others. As a result, situations arise when more than one device is active or may become active at the same time.

In the prior art, the ability to talk to several people on one telephone, conference calling, has been provided either by a telephone base station or network facilities. The telecommunications service provider may charge a fee for providing conference calling functions. Another limitation is that the user interface to setup and control the two telephone calls to initiate a conference call is reliant upon the dial pad of a single telephone. Typically, the user must establish a first call with one of the conference participants. The user must then somehow place that participant on hold. The user must then initiate a call to a second conference participant. If the second conference participant answers, the user must somehow join this second call with the first call that has been placed on hold. If the second conference participant does not answer, the user must somehow terminate the second call and switch back to the first call previously placed on hold.

Since the telephone dial pad is optimized for making and receiving only a single call at a time, there is uncertainty and confusion on the part of users attempting to initiate a conference call using a single dial pad to perform the call origination, hold, and connect functions for multiple calls simultaneously. The user often fears losing one or both calls. As a result, the conference capability, even if available, is generally not used by the majority of ordinary telephone users.

As a result, there is a need for improved methods and systems for enabling conference calls.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
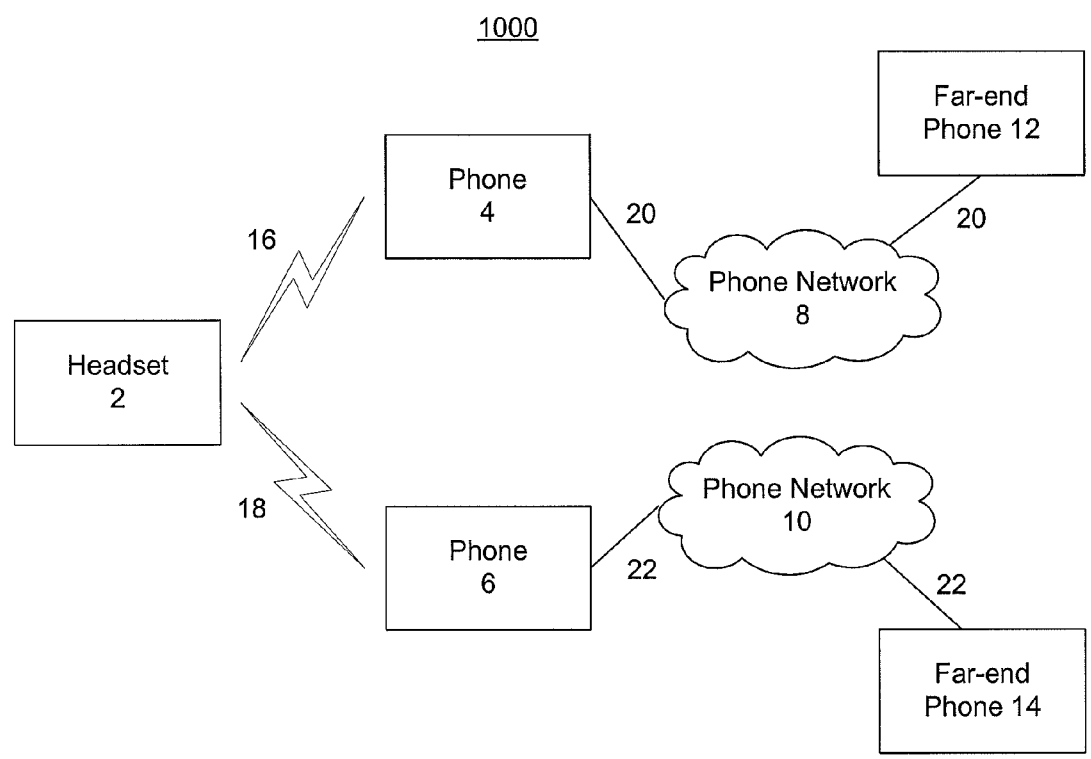
FIG. 1 illustrates a system for in-headset conference calling.

Methods and apparatuses for in-headset conference calling are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

In one example, a single Bluetooth (BT) headset mixes the audio from the headset microphone and two Audio Gateways (AG) such that all three parties involved can clearly communicate with each other simultaneously. Utilizing the headset to enable the conference call, the user has an intuitive way of making three-way conference calls. This is a significant step in telephony, as previous conferencing solutions have been cumbersome, and as a result are used incorrectly or not used at all. There is no need to place a party on hold when making a call to or receiving a call from an additional far end user, as a different independent telephone is being used.

Telephone calls are generally seen as one to one, and the systems and methods described herein provide an effortless way of speaking to two people at once. Advantageously, two local (also referred to as "near end") telephones within the immediate vicinity of the user can be used independently using different telephony channels (e.g., landline networks, cellular networks, VoIP networks, etc.), where each telephone is operated in the normal manner the user is accustomed to while still allowing a three way call to be established. Both telephones can be operated in an ordinary manner to make and receive calls independently from each other and independently from the headset. During the conference call, each telephone operates independently from the other. Callers on two independent remote (also referred to as "far end") telephones on different calls can communicate with each other.

Furthermore, use of more than one telephone at a time is encouraged in the presented systems and methods, thereby increasing talk time across multiple telephones. For example, a person's mobile telephone talk time is increased in circumstances where the user typically only uses a landline telephone since the mobile telephone can be used in conjunction with the landline telephone. This will benefit OEM carriers where revenues are based on talk time.

The use of a wireless headset to perform the conferencing functions is particularly advantageous as wireless headsets are easily paired with multiple telephony devices. This allows the headset user to utilize their headset with more than one of their telephones. For example, no additional hardware is required for a Bluetooth headset to be paired with two different telephones so that the headset can receive audio communications from either the first telephone or the second telephone, or both telephones simultaneously. Furthermore, wireless headsets are often worn on the ear at all times, even when not in use, and provides hands-free operation. Thus, the headset is easily accessible for use with any of the multiple telephony devices and a convenient and natural focal point for conferencing functions.

In one example, a headset for establishing a conference call includes a speaker, a microphone for receiving speech energy from a headset user, and a wireless communications transceiver. The wireless communications transceiver is operable to form a first local wireless link with a first local telephone in communication with a first far end telephone user and a second local wireless link with a second local telephone in communication with a second far end telephone user. The first far end telephone user operates a first far end telephone. The second far end telephone user operates a second far end telephone. The headset further includes a processor or circuit operable to establish a conference call between the headset user, the first far end telephone user, and the second far end telephone user.

In one example, a method for establishing a conference call utilizing a headset includes forming a first local wireless link between a headset and a first local telephone responsive to the first local telephone establishing communication with a first far end telephone user at a first far end telephone. The method further includes forming a second local wireless link between the headset and a second telephone responsive to the second local telephone establishing communication with a second far end telephone user at a second far end telephone. A conference call is established between the headset user, the first far end telephone user, and the second far end telephone user.

In one example, a computer readable storage medium stores instructions that when executed by a headset processor perform a method for establishing a conference call. The method includes forming a first local wireless link with a first telephone, where the first telephone is in communication with a first far end telephone user, and forming a second local wireless link with a second telephone, where the second telephone is in communication with a second far end telephone user. The method further includes establishing a conference call between the headset user, the first far end telephone user, and the second far end telephone user.

FIG. 1 illustrates a system 1000 for in-headset conference calling. The system 1000 includes a headset 2 having a wireless communications transceiver operable to form a local wireless link 16 with a local telephone 4, where the local telephone 4 is in communication with the user of a far end telephone 12 via a communication link 20 through a telephone network 8. The headset 2 is also able to form a local wireless link 18 with a telephone 6, where the local telephone 6 is in communication with the user of a far end telephone 14 via a communication link 22 through telephone network 10. In operation, the headset 2 establishes a conference call between the user of headset 2, the user of far-end telephone 12, and the user of far-end telephone 14.

In one example, the headset 2 is a Bluetooth communications headset having a Bluetooth transceiver. In further examples, other wireless communication protocols may be used, such as IEEE 802.11. The local wireless link 16 is a Bluetooth link including both an SCO audio channel and an ACL control channel. Similarly, the local wireless link 18 is a Bluetooth link including both an SCO audio channel and an ACL control channel.

Telephone 4 may, for example, be a VoIP telephone, mobile cellular network telephone, or public switched telephone network (PSTN) telephone. Depending on the type of telephone 4, telephone network 8 may be the PSTN, a wireless telecommunication provider network, or IP network implementing VoIP. Similarly, telephone 6 may, for example, be a VoIP telephone, mobile cellular network telephone, or PSTN telephone. Depending on the type of telephone 6, telephone network 10 may be the PSTN, a wireless telecommunication provider network, or IP network implementing VoIP. Any combination of telephone 4 type and telephone 6 type is possible, with each telephone having an appropriate network interface in addition to the wireless interface to communication with headset 2. One of ordinary skill in the art will recognize that telephone 4 and telephone 6 may be any device capable of transmitting and receiving voice communications, and telephone network 8 and telephone network 10 may be any type of communications network capable of carrying voice data.

Headset 2 is capable of having simultaneous open audio channels to two audio gateways, one at telephone 4 and one at telephone 6. Headset 2 is capable of mixing audio signals received from the two audio gateways with audio received at a headset microphone so that the headset 2 user, a far end caller using far-end telephone 12 on a call with telephone 4, and a far end caller using far-end telephone 14 on a call with telephone 6 can communicate with each other simultaneously. One advantage of the system 1000 is that the user of headset 2 can use both telephone 4 and telephone 6 in their normal and typical manner. For example, telephone 4 and telephone 6, both local to the user, can be used in the usual manner to make or receive a call on each. When telephone 4 and telephone 6 are each individually in communication with far end callers, the headset 2 can initiate a conference call so that the user of headset 2 can listen to and talk to both far end callers, and both far end callers can listen to and talk with each other as well as the user of headset 2.

Figure 2:
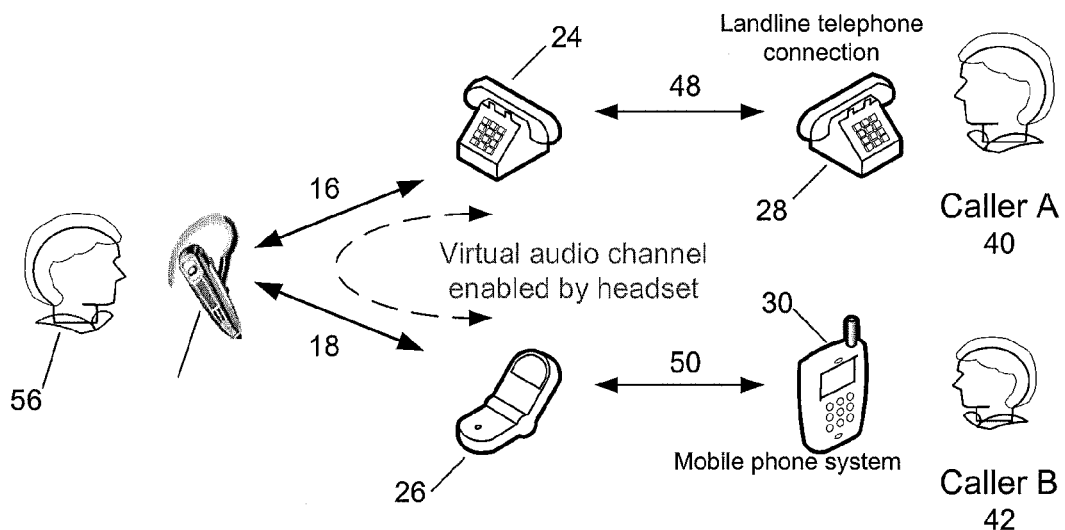
FIG. 2 illustrates the system shown in FIG. 1 in one example configuration.

FIG. 2 illustrates the system shown in FIG. 1 in one example configuration. In the configuration shown in FIG. 2, a headset wearer 56 using headset 2 is able to form a local wireless link 16 with a local desk telephone 24, where the desk telephone 24 is in communication with a caller A 40 using a far end desk telephone 28 via a landline communication link 48 through the PSTN. The headset wearer 56 using headset 2 is also able to form a local wireless link 18 with a mobile telephone 26, where the mobile telephone 26 is in communication with a caller B 42 using a far end mobile telephone 30 via a mobile communication link 50 through a cellular communications network. In operation, the headset wearer 56 establishes a conference call between the headset wearer 56, caller A 40, and caller and B 42. Once the conference call is established, a "virtual channel" (as termed by the inventors) between mobile telephone 26 and local desk telephone 24 is established, allowing caller A 40 using desk telephone 28 and caller B 42 using mobile telephone 30 to speak with each other.

Figure 3:
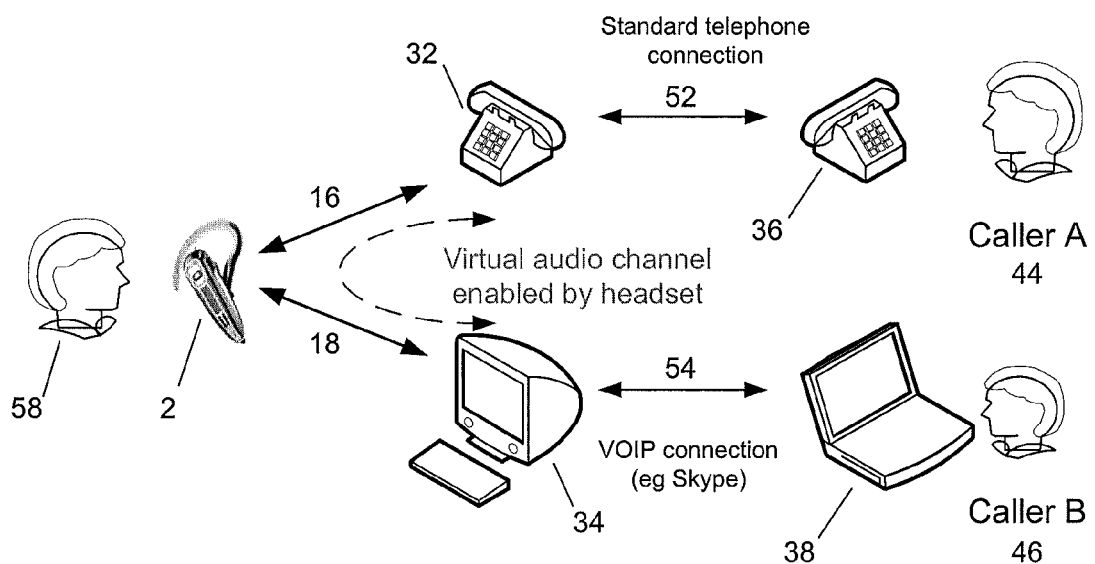
FIG. 3 illustrates the system shown in FIG. 1 in a further example configuration.

FIG. 3 illustrates the system shown in FIG. 1 in a further example configuration. In the configuration shown in FIG. 3, a headset wearer 58 using headset 2 is able to form a local wireless link 16 with a local desk telephone 32, where the desk telephone 32 is in communication with a caller A 44 using a far end desk telephone 36 via a landline communication link 52 through the PSTN. The headset wearer 58 using headset 2 is also able to form a local wireless link 18 with a VoIP telephone 34, where the VoIP telephone 34 is in communication with a caller B 46 using a far end VoIP telephone 38 via an IP link 54 through an IP communications network.

In the example shown in FIG. 3, VoIP telephone 34 is implemented using a desktop PC, and the VoIP telephone 38 is implemented using a notebook PC. One of ordinary skill in the art will recognize that a variety of computing devices may be used to implement VoIP communications. The desktop PC is connected to the Internet. In one example, where the headset 2 is a Bluetooth headset, the headset 2 communicates with a USB Bluetooth module (also referred to as a dongle) via the local wireless link 18, where the USB Bluetooth module includes a USB interface which may be inserted into a USB interface of the desktop PC. The desktop PC executes a Voice-Over-Internet Protocol (VoIP) Softphone software application, thereby enabling headset 2 to operate as a telecommunications device.

The USB Bluetooth module at the desktop PC includes a Bluetooth audio gateway which is the gateway for both input audio and output audio. The Bluetooth headset 2 acts as remote audio input and output mechanism for the Bluetooth audio gateway. Audio signals provided by the VoIP Softphone application are sent to the USB Bluetooth module and then wirelessly sent to headset 2. Audio signals from the headset 2 are sent via the USB Bluetooth module to the VoIP Softphone application. The VoIP Softphone application operates to handle bi-directional IP based telephony between the desktop PC and the Internet.

In operation, the headset wearer 58 establishes a conference call between the headset wearer 58, caller A 44, and caller and B 46. Once the conference call is established, a "virtual audio channel" between VoIP telephone 34 and local desk telephone 32 is established, allowing caller A 44 using desk telephone 36 and caller B 46 using VoIP telephone 38 to speak with each other.

Figure 4:
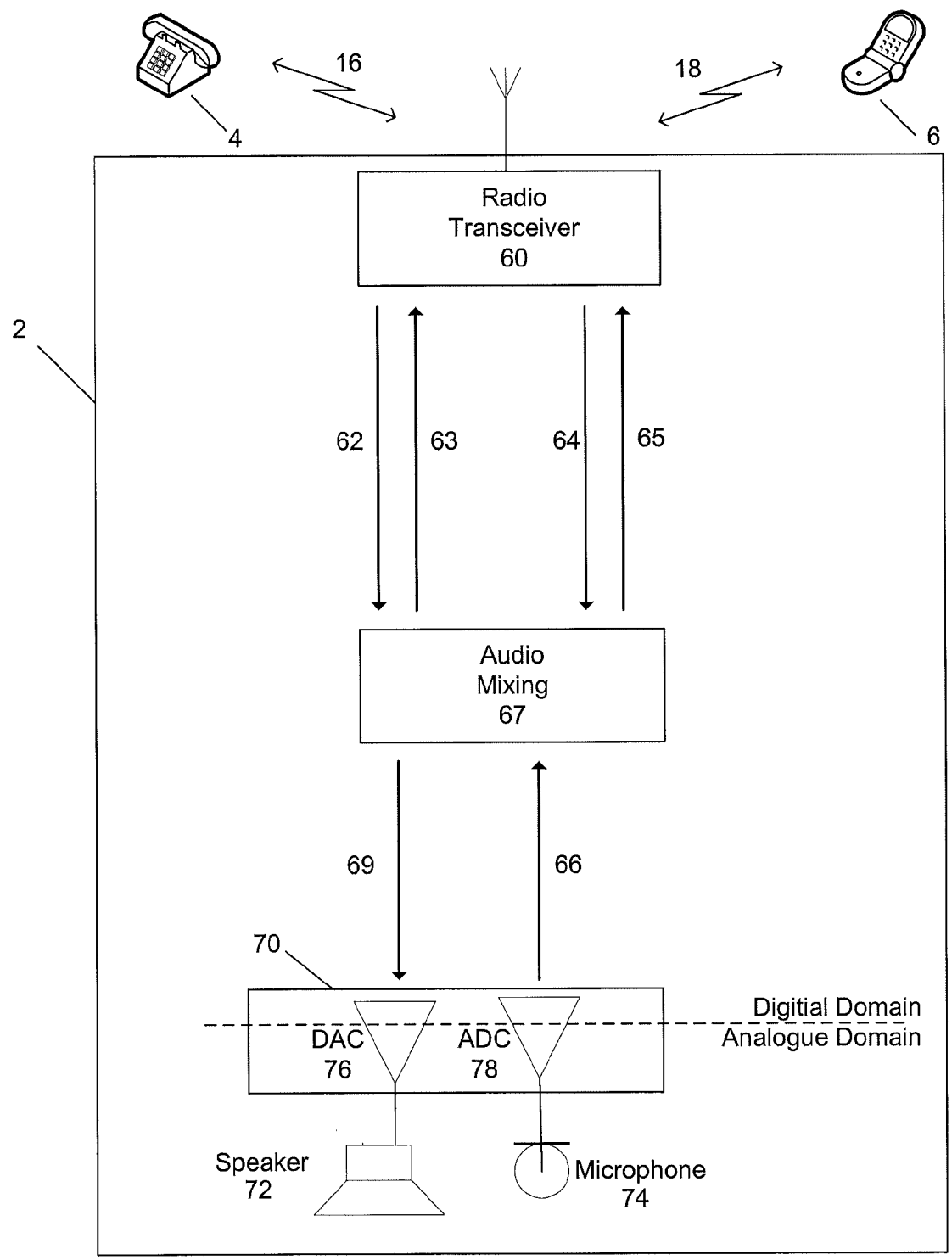
FIG. 4 is a diagram illustrating establishment of a conference call at the headset shown in FIG. 1.

FIG. 4 is a diagram illustrating establishment of a conference call at the headset shown in FIG. 1. The headset 2 includes a radio transceiver 60 which receives a receive audio signal 62 from radio link 16 to telephone 4. Radio transceiver 60 also receives a receive audio signal 64 from radio link 18 to telephone 6. Receive audio signal 62 and receive audio signal 64 are provided to an audio mixing block 67. Audio mixing block 67 also receives a receive audio signal 66 from analog to digital converter (ADC) 78 corresponding to speech by the headset wearer detected at the headset microphone 74. Audio mixing block 67 processes receive audio signal 62, receive audio signal 64, and receive audio signal 66 to establish a conference call between the headset wearer, telephone 4 user, and telephone 6 user so that each user can hear the other users. Audio mixing block 67 outputs a transmit audio signal 63 to be sent to telephone 4, a transmit audio signal 65 to be sent to telephone 6, and a transmit audio signal 69 to be sent to headset speaker 72 via digital to analog converter (DAC) 76. DAC 76 and ADC 78 are components of an audio encoder/decoder 70.

Figure 5:
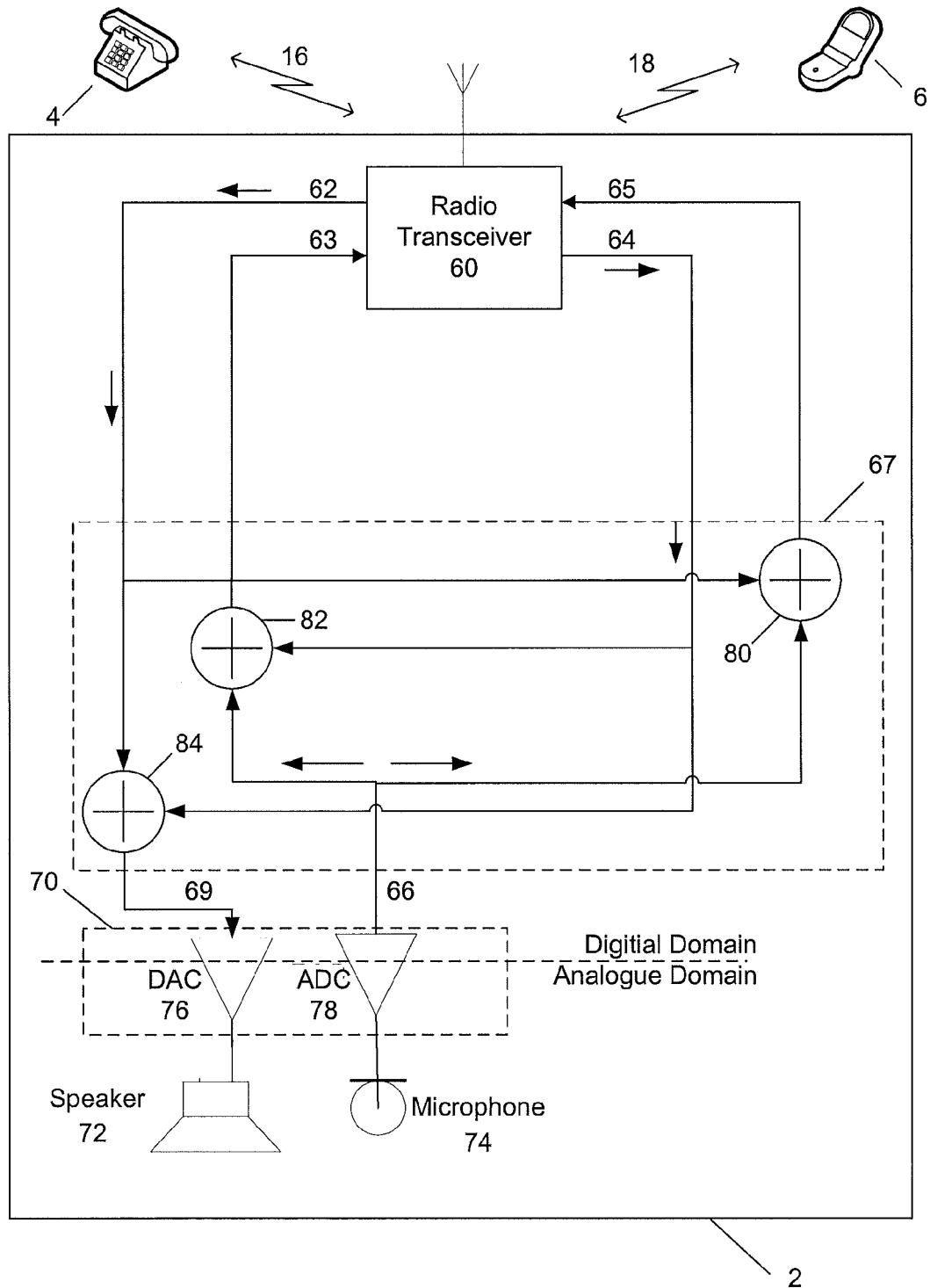
FIG. 5 is a diagram illustrating mixing of audio signals at the headset during a conference call.

FIG. 5 is a diagram illustrating mixing of audio signals by the mixing block 67 shown in FIG. 4 during a conference call in one example implementation. Mixing block 67 includes a signal adder 80, signal adder 82, and signal adder 84. Signal adder 80 receives and sums receive audio signal 62 and microphone audio signal 66 to form transmit audio signal 65. Signal adder 82 receives and sums receive audio signal 64 and microphone audio signal 66 to form transmit audio signal 63. Signal adder 84 receives and sums receive audio signal 62 and receive audio signal 64 to form transmit audio signal 69. In this manner, a conference call between the headset wearer, telephone 4 user, and telephone 6 user is established within headset 2. In further examples, additional mixing techniques known in the art may be used to establish the conference call.

Figure 6:
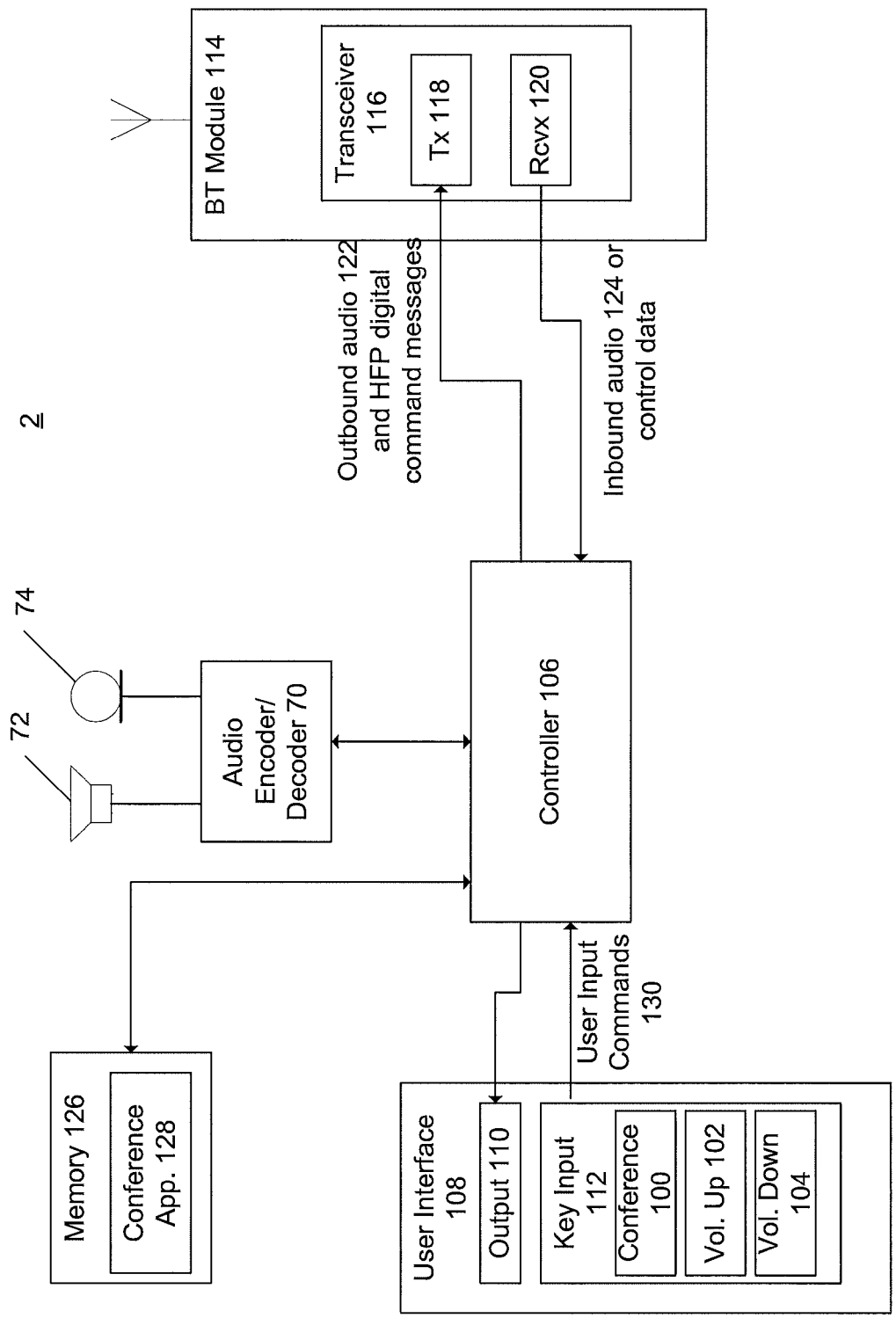
FIG. 6 illustrates a simplified block diagram of the Bluetooth headset shown in FIG. 1.

FIG. 6 illustrates a simplified block diagram of the headset shown in FIG. 1 where the headset 2 utilizes Bluetooth. For clarity, not all components of the headset 2 are illustrated. The headset 2 includes a Bluetooth module 114, an audio encoder/decoder 70, memory 126, controller 106, user interface 108, speaker 72, and microphone 74. User interface 108 includes a key input 112. Key input 112 includes a conference function 100, volume up input 102 and volume down input 104. Key input 112 also includes a hookswitch function (not shown). The user interface 108 may also include one or more output interfaces 110 typical to headsets, such as LED indicators or some form of a display. The speaker 72 may also be used as an interface output.

In one example, conference function 100 is a separate dedicated user input button used solely to join two calls to establish the conference call. One or more additional user input buttons are used to switch between a first call with a first telephone and a second call with a second telephone. In a further example, a single user interface button is used to cycle between a conference call, a first call with a first telephone, and a second call with a second call. In one example, intuitive tones output through speaker 72 are utilized to indicate which call is connected, combined with consistent key presses that enable all functions to be handled. For example, a low tone is used for one connection and a high tone for second connection. In a further example, a single tone is used for one connection and two tones are used for a second connection.

Bluetooth module 114 includes a transceiver 116 having a transmitter 118 and a receiver 120. In the present example, Bluetooth module 114 receives and transmits a wireless signal utilizing the Bluetooth protocol Hands-Free Profile. The wireless signal transmitted by transmitter 118 includes outbound audio 122 and Hands-Free Profile command messages received from controller 106. Inbound audio 124 and control data is received by receiver 120 and sent to controller 106. Audio encoder/decoder 70 is used for processing a digital audio signal and an analog audio signal as known in the art. Memory 126 stores a conference application 128 executed by controller 106 to perform conferencing functions as described herein. Such conferencing functions may be initiated by the headset user with the conference function 100 key input. Memory 126 is also used to store digital data, and can take a variety of well known forms, such as flash memory or memory integrated with controller 106.

The Bluetooth transceiver 116 is operable to simultaneously form a first Bluetooth SCO link with a first local telephone in communication with a first far end telephone user and a second Bluetooth SCO link with a second local telephone in communication with a second far end telephone user. Controller 106 is operable to receive user input commands 130 from user interface 108 and convert these commands to Hands-Free Profile digital command messages. In one example, controller 106 is part of a Bluetooth chip set. These Hands-Free Profile digital command messages are sent to Bluetooth module 114 for wireless transmission using Bluetooth module 114. Controller 106 also receives inbound audio or audio files for output by speaker 72 following decoding by audio encoder/decoder 70. User interface 108, and in particular conference function 100, can be any combinations of visual interfaces, tactile interfaces, and/or an audio interface that allow the user to input commands. Conference function 100 enables the headset user to initiate the conference call between the headset user, a first far end telephone user, and a second far end telephone user with a single action input, such as a single button press.

Figure 7:
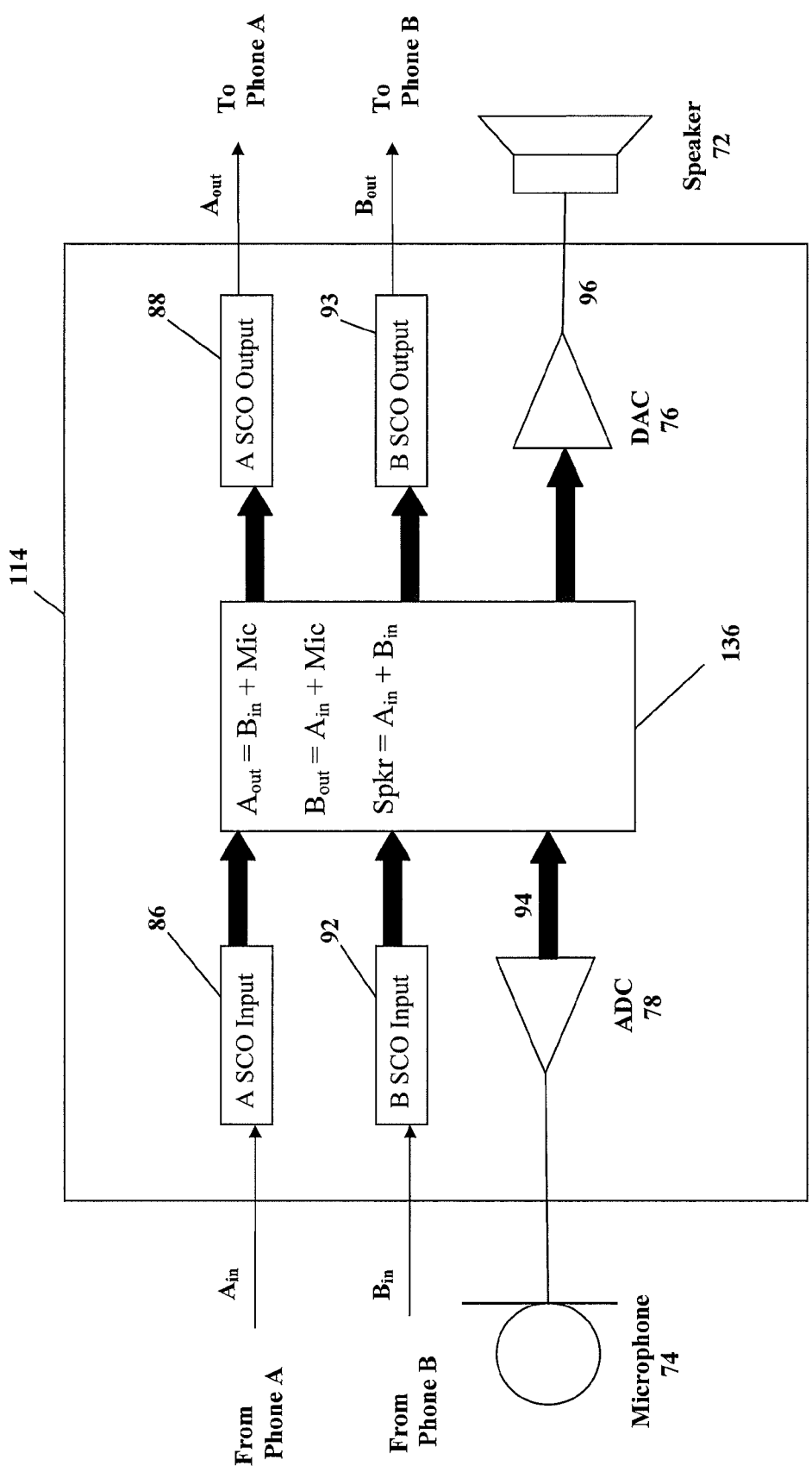
FIG. 7 illustrates a mathematical description of using a digital signal processor for the audio mix process.

FIG. 7 illustrates a mathematical description of using a Bluetooth module 114 for the audio mix process during a conference call. For example, the Bluetooth module 114 may be a CSR BlueCore5-Multimedia Bluetooth chip or other equivalent product. The CSR BlueCore5-Multimedia Bluetooth chip opens two wireless audio (SCO) connections simultaneously when desired. Bluetooth module 114 receives three input audio signals: an A SCO Input 86 corresponding to speech received from a far end telephone A on a first Bluetooth SCO link with a first local telephone, a B SCO Input 92 corresponding to speech received from a far end telephone B on a second Bluetooth SCO link with a second local telephone, and a near end user audio signal input 94 corresponding to speech received at the headset microphone 74 and converted using ADC 78.

A digital signal processor 136 receives the three input audio signals and processes the signals to enable the in-headset conference call between the headset user, far end telephone A user, and far end telephone B user. The Bluetooth module 114 outputs three audio signals: an A SCO Output 88 corresponding to the mixing of B SCO Input 92 and audio signal input 94, a B SCO Output 93 corresponding to the mixing of A SCO Input 86 and audio signal input 94, and an audio signal output 96 corresponding to the mixing of A SCO Input 86 and B SCO Input 92. A SCO Output 88 is output to the far end telephone A user via a first near end telephone, B SCO Output 93 is output to the far end telephone B user via a second near end telephone, and audio signal output 96 is output to the headset user through speaker 72 following conversion with DAC 76. Functions performed by digital signal processors described herein may also be performed by analog circuits in further examples.

Figure 8A:
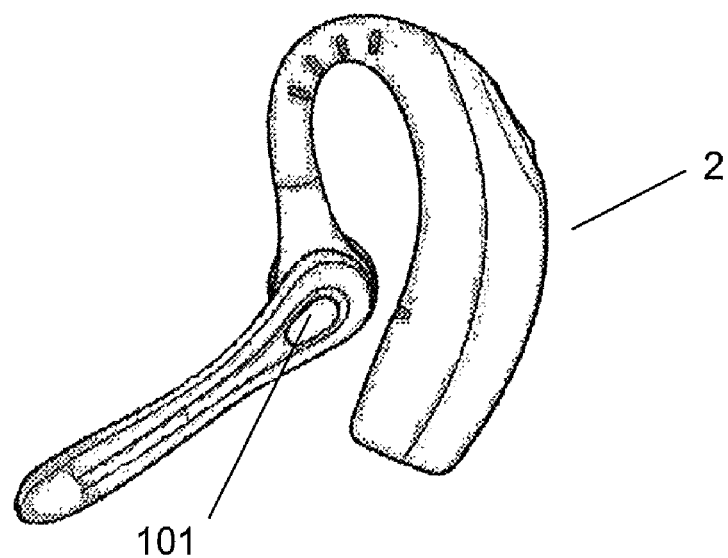
FIG. 8A illustrates a side perspective view of the Bluetooth headset shown in FIG. 1.
Figure 8B:
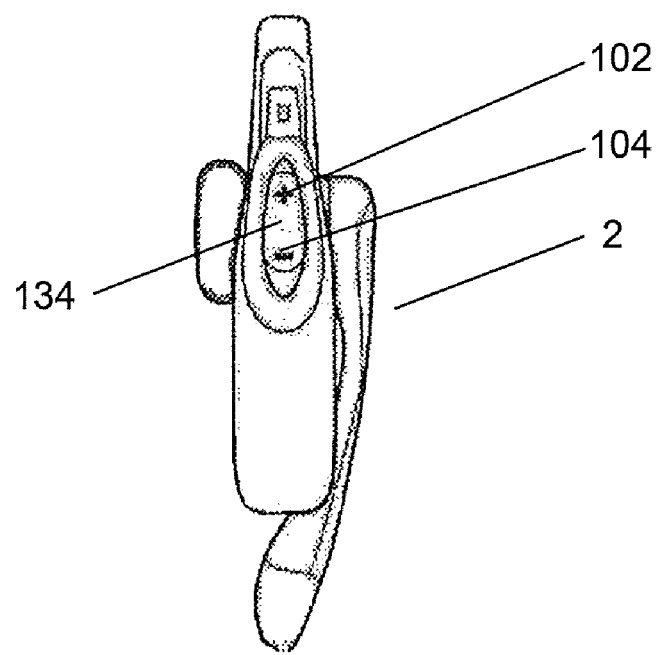
FIG. 8B illustrates a rear perspective view of the Bluetooth headset shown in FIG. 1.
Figure 9A:
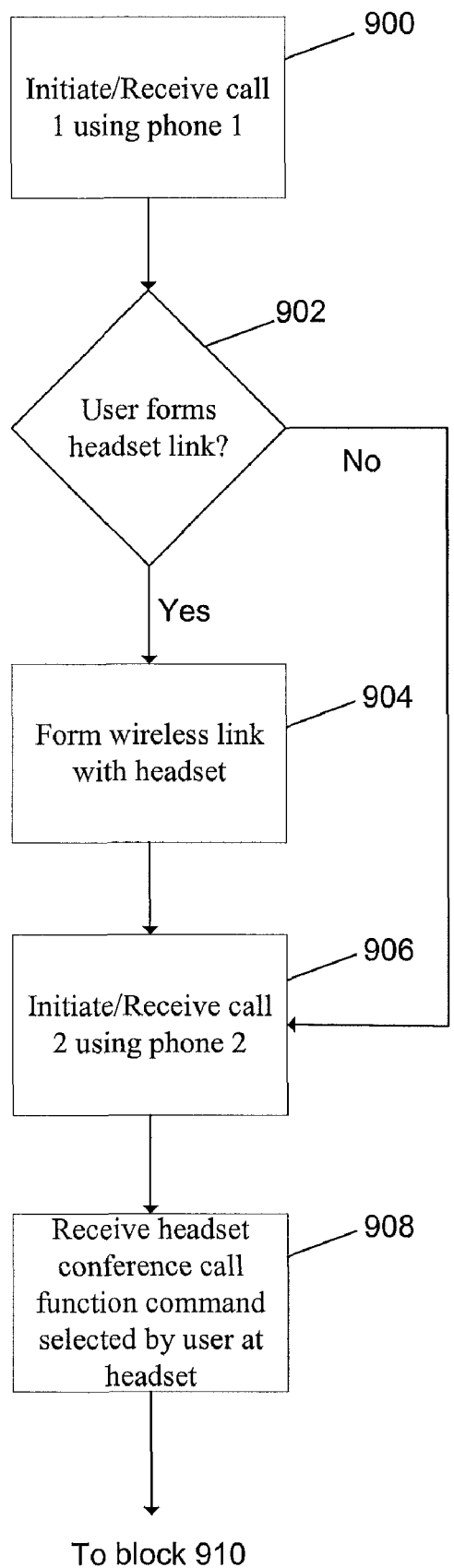
FIGS. 9A and 9B are a flow diagram illustrating establishing an in-headset conference call.
Figure 9B:
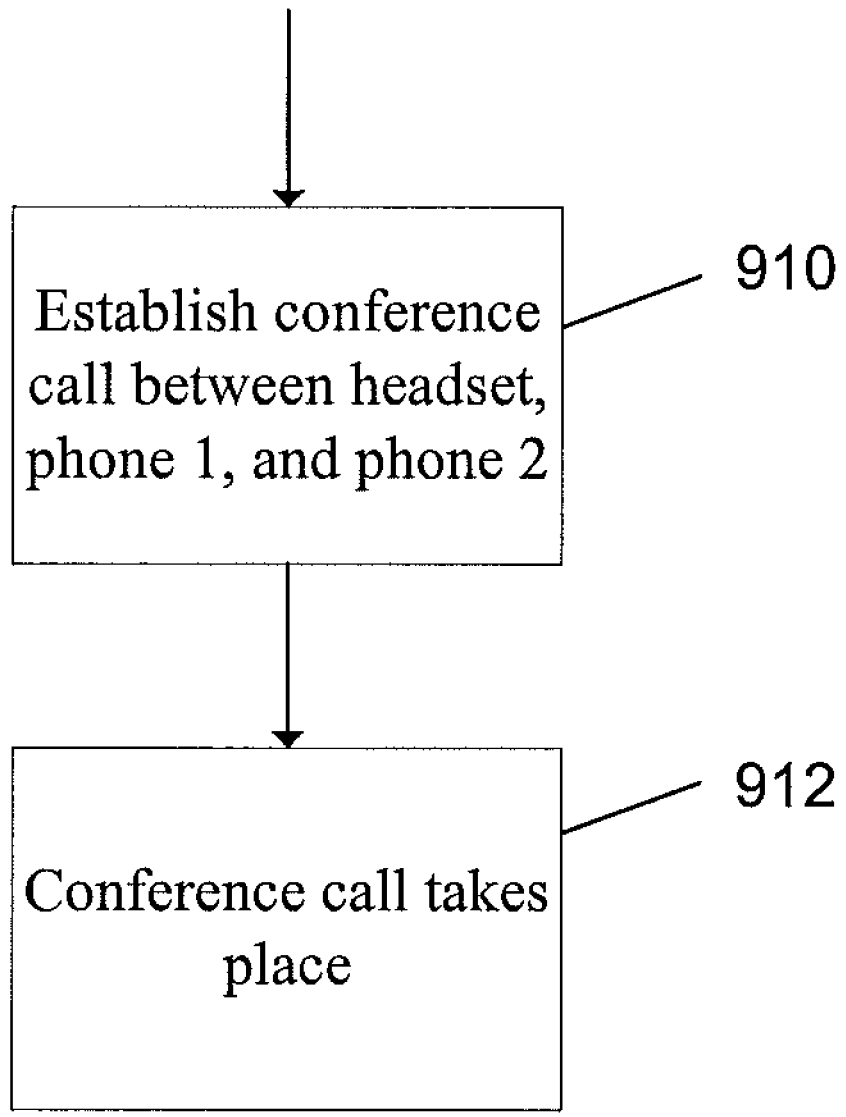

FIGS. 8A and 8B illustrate a front and side perspective view of the headset 2 shown in FIG. 6. Headset 2 includes a user interface such as rocker input 134 having a volume up input 102 and a volume down input 104. Headset 2 further includes a dedicated button 101 implementing conference function 100. In a further example, button 101 is multi-functional, and may also be used as a call control button in addition to implementing conference function 100. One of ordinary skill in the art will recognize that a variety of user interface input mechanisms may be used which allow the user to input a conference command, hookswitch command, menu navigation command, volume up command, and volume down command FIGS. 9A and 9B are a flow diagram illustrating establishing an in-headset conference call. At block 900, a headset user initiates a call 1 to a first far end telephone or receives a call 1 from a first far end telephone using a local telephone 1. At decision block 902, the headset user may form a link between the headset and telephone 1 to transfer audio to the headset so that the user can utilize the headset for call 1. If yes at decision block 902, a wireless link is formed between telephone 1 and the headset. In an example where Bluetooth communications are used, telephone 1 opens an audio channel (SCO) with the headset. If no at decision block 902, then the process proceeds to block 906. While the headset user is on call 1, at block 906 the headset user may initiate a call 2 to a second far end telephone or receive a call 2 from a second far end telephone using a local telephone 2. Use of local telephone 2 is independent from local telephone 1, and local telephone 2 is used in an ordinary manner to make or receive call 2. Call 1 need not be placed on hold to make or receive call 2. With two active calls (call 1 and call 2) using two different telephones (telephone 1 and telephone 2), the user may desire to establish a conference call combining the two calls. Alternatively, the user may receive a user interface action at the headset to select between call 1 and call 2 without establishing a conference call.

At block 908, a headset conference call function command selected by the user is received at the headset. This conference call function command may be selected by the user using a single action button press. In a Bluetooth example, two audio (SCO) channels are opened, one channel between the headset and telephone 1 (if not yet open at block 902), and one channel between the headset and telephone 2. At block 910, a conference call is established using the headset, telephone 1, and telephone 2. At block 912, the conference call takes place between the headset user, first far end telephone user, and second far end telephone user.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: the type of communication network used by the telephones, standards to perform the VoIP call setup, signaling, and control; methods for mixing audio signals to establish a conference call; user interface input mechanisms to control conference or hookswitch operation at the headset. For example, the communications network used may be a PSTN, a public or private data network, wireline or wireless network, or the Internet. Furthermore, the functionality associated with any blocks described above may be centralized or distributed. It is also understood that one or more blocks of the headset may be performed by hardware, firmware or software, or some combinations thereof. Such modifications and changes do not depart from the true spirit and scope of the present invention that is set forth in the following claims.

Those skilled in the art will appreciate that the reference to the terms "VoIP" and "VoIP telephone" are used in the generic sense to include any "voice-over-packet" technique or device, without limitation to a specific standard.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A headset for establishing a conference call comprising:
    a speaker;
    a microphone for receiving speech energy from a headset user;
    a wireless communications transceiver operable to form a first local wireless link with a first local telephone for communication with a first far end telephone user and a second local wireless link with a second local telephone for communication with a second far end telephone user; and
    a processor or circuit operable to establish a conference call between the headset user, the first far end telephone user, and the second far end telephone user.

2. The headset of claim 1, wherein the wireless communications transceiver is a Bluetooth transceiver.

3. The headset of claim 2, wherein the first local wireless link is a first Bluetooth SCO link and the second local wireless link is a second Bluetooth SCO link.

4. The headset of claim 1, wherein the first local telephone is a VoIP telephone, mobile cellular network telephone, or public switched telephone network telephone, and the second local telephone is a VoIP telephone, mobile cellular network telephone, or public switched telephone network telephone.

5. The headset of claim 1, wherein the headset further comprises a user interface for receiving a user single action input to initiate the conference call between the headset user, the first far end telephone user, and the second far end telephone user.

6. The headset of claim 1, wherein the processor or circuit mixes two or more of the following audio signals: a first audio signal received on the first local wireless link, a second audio signal received on the second local wireless link, a third audio signal corresponding to speech energy from the headset user.

7. The headset of claim 6, wherein the processor or circuit mixes the first audio signal received on the first local wireless link and the second audio signal received on the second local wireless link to output to the speaker.

8. A method for establishing a conference call utilizing a headset comprising:
forming a first local wireless link between a headset and a first local telephone for communicating with a first far end telephone user;
forming a second local wireless link between the headset and a second local telephone for communicating with a second far end telephone user; and
initiating the conference call between a headset user, the first far end telephone user, and the second far end telephone user.

9. The method of claim 8, further comprising receiving a user interface action at the headset to initiate the conference call between the headset user, the first far end telephone user, and the second far end telephone user.

10. The method of claim 9, wherein the user interface action comprises a button press.

11. The method of claim 8, further comprising receiving a user interface action at the headset to initiate forming the first local wireless link between the headset and the first local telephone.

12. The method of claim 8, further comprising receiving a user interface action at the headset to initiate forming the second local wireless link between the headset and the second telephone.

13. The method of claim 8, wherein the first local wireless link is a first Bluetooth SCO link and the second local wireless link is a second Bluetooth SCO link.

14. A computer readable storage medium storing instructions that when executed by a headset processor perform a method for establishing a conference call comprising:
forming a first local wireless link between a headset and a first local telephone for communicating with a first far end telephone user;
forming a second local wireless link between the headset and a second local telephone for communicating with a second far end telephone user; and
initiating a conference call between a headset user, the first far end telephone user, and the second far end telephone user.

15. The computer readable storage medium of claim 14, wherein the first local wireless link is a first Bluetooth SCO link and the second local wireless link is a second Bluetooth SCO link.

16. The computer readable storage medium of claim 14, wherein the first local telephone is a VoIP telephone, mobile cellular network telephone, or public switched telephone network telephone, and the second local telephone is a VoIP telephone, mobile cellular network telephone, or public switched telephone network telephone.

17. The computer readable storage medium of claim 14, wherein the method further comprises receiving a user single action user interface input to initiate the conference call between the headset user, the first far end telephone user, and the second far end telephone user.

18. The computer readable storage medium of claim 14, further comprising receiving a user interface action at the headset to initiate forming the first local wireless link between the headset and the first local telephone.

19. The computer readable storage medium of claim 14, further comprising receiving a user interface action at the headset to initiate forming the second local wireless link between the headset and the second telephone.

20. The computer readable storage medium of claim 14, wherein the first local wireless link and the second local wireless link are formed using a Bluetooth transceiver.

* * * * *